(12) United States Patent
Shimizu et al.

(10) Patent No.: US 6,849,171 B2
(45) Date of Patent: Feb. 1, 2005

(54) LIGHT WAVEGUIDE FORMING METHOD, ELECTROLYTE SOLUTION, LIGHT WAVEGUIDE FORMING APPARATUS AND LIGHT WAVEGUIDE

(75) Inventors: Keishi Shimizu, Nakai-machi (JP); Shigemi Ohtsu, Nakai-machi (JP); Kazutoshi Yatsuda, Nakai-machi (JP); Eiichi Akutsu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 304 days.

(21) Appl. No.: 10/087,739

(22) Filed: Mar. 5, 2002

(65) Prior Publication Data

US 2002/0122649 A1 Sep. 5, 2002

(30) Foreign Application Priority Data

Mar. 5, 2001 (JP) .................................... 2001-060242

(51) Int. Cl.[7] ................................................ C25D 5/00
(52) U.S. Cl. ............................ 205/91; 205/123; 205/79
(58) Field of Search ............................ 205/79, 91, 118, 205/122, 123

(56) References Cited

U.S. PATENT DOCUMENTS 6,340,544 B1 * 1/2002 Akutsu et al. .................. 430/7
6,613,486 B1 * 9/2003 Ohtsu et al. .................... 430/7

FOREIGN PATENT DOCUMENTS

| JP | 10-119414 | 5/1998 |
|----|-----------|--------|
| JP | 11-105418 | 4/1999 |
| JP | 11-133224 | 5/1999 |
| JP | 11-174790 | 7/1999 |
| JP | 11-189899 | 7/1999 |
| JP | 11-335894 | 12/1999 |

* cited by examiner

Primary Examiner—Donald R. Valentine
(74) Attorney, Agent, or Firm—Morgan Lewis & Bockius LLP

(57) ABSTRACT

In a method for forming a light waveguide, a light waveguide forming substrate is disposed so that a photosemiconductor thin film or a conductive thin film on the substrate is in contact with an aqueous electrolyte solution containing a film forming material having a property that solubility or dispersibility to a water solution decreases according to the pH change, and a voltage is applied between the photosemiconductor thin film or the conductive thin film and a counter electrode by light irradiation.

15 Claims, 8 Drawing Sheets

LIGHT WAVEGUIDE FORMING METHOD, ELECTROLYTE SOLUTION, LIGHT WAVEGUIDE FORMING APPARATUS AND LIGHT WAVEGUIDE

BACKGROUND OF THE INVENTION

1. Field of the Invention

This invention relates to a method for forming a light waveguide by use of polymer material, and it is usable for various light waveguide, optical integrated circuit, and optical wiring board to be used in general optical field, micro optical field, optical communication field, and optical information processing field.

2. Description of the Related Art

Inorganic material such as quartz, glass, and oxide ferroelectric material, and polymer material have been used for forming a light waveguide. Among these materials, polymer material is suitable for forming a light waveguide having a large area because polymer material is easy to be formed in the thin film configuration by means of spin coat technique and dip technique in comparison with inorganic material. Furthermore, according to this method, polymer material is advantageous in that a light waveguide can be formed on a substrate that is difficult to be subjected to high temperature heat treatment such as a semiconductor substrate and plastic substrate in the case where polymer material is used because a film can be formed without high temperature heat treatment when the film is formed, differently from the case where inorganic glass such as quartz is used. Furthermore, a flexible light waveguide can be formed because of the flexibility and resiliency of polymer material. On the reason described hereinabove, it is expected that the light waveguide parts such as optical integrated circuit used in the optical communication field and optical wiring board used in the optical information processing field is mass-produced at low cost by use of optical polymer material.

It is said that the optical polymer material is problematic in the environmental resistance such as heat resistance and humidity resistance, but such problematic properties of the optical polymer material have been improved recently. Furthermore, a method in which photosensitive polymer or resist is used is very simple and excellent in mass-productivity.

However, because polymer material that is solid at a room temperature has been used as photosensitive material heretofore, a thick film formed of polymer material causes scattering seriously in the ultraviolet region and visible region to result in poor light transmittance. As the result, the reliability of a pattern of a thick film is low particularly and results in poor resolution when the polymer material is hardened. These disadvantages are reflected adversely on the loss of a light waveguide formed of polymer material. Furthermore, because the absorption loss of the material is not improved and the transparency has remained poor, the waveguide loss is high disadvantageously. On the reason described hereinabove, the optical parts formed of such photosensitive material is insufficient to be used practically.

To solve the abovementioned problem, a method in which a pattern is formed by use of liquid photoresist instead of polymer material that is solid in the room temperature has been proposed. However, because such material is fluid, the thickness of a coated film is changed after coating of the resin and the change does not allow the film to be formed reproducibly and controllably. Furthermore, the method in which photosensitive material is used requires complex process such as etching, and hazardous alkaline waste liquid is generated in the process, and a large number of processes are required.

On the other hand, the inventors of the present invention proposed a method for forming an image and a method for manufacturing color filter previously in which electrodeposition material containing coloring material is electrically deposited or photoelectrically deposited by applying a low voltage to form an image excellent in resolution. The invention is disclosed in detail in Japanese Published Unexamined Patent Applications No. Hei 10-119414, No. Hei 11-189899, No. Hei 11-105418, No. Hei 11-174790, No. Hei 11-133224, and No. Hei 11-335894. The method for forming an image and the method for manufacturing color filter is characterized in that a color film excellent in resolution is formed by means of a simple method, and this technique is applied mainly in the field of the display device such as liquid crystal display device.

On the other hand, the light waveguide is a technique used in the field of the optical communication that is different from the field of the display device. The light waveguide is formed from dielectric material or photosensitive material by means of fine working through complex processes including photolithography. A method for forming a light waveguide by means of electrodeposition technique without complex processes such as photolithography has not been proposed.

SUMMARY OF THE INVENTION

The present invention has been accomplished in view of the abovementioned current circumstances, and provides a method and apparatus that are served to manufacture a precise light waveguide simply and mass-productively by employing electrodeposition technique or photovoltaic electrodeposition technique that are capable of simply forming a fine pattern excellent in resolution with less hazardous waste liquid.

The present invention provides a method for forming a light waveguide, electrolyte solution used in the method, and apparatus for manufacturing the light waveguide.

The present invention provides a light waveguide forming method including a step in which a light waveguide forming substrate that has been formed by laminating a conductive thin film and an photosemiconductor thin film in this order on an insulative substrate is disposed so that at least the photosemiconductor thin film of the light waveguide forming substrate is in contact with an aqueous electrolyte solution containing film forming material having a property that solubility or dispersibility in a water solution decreases according to its pH, a voltage is applied between a selected region of the photosemiconductor thin film and a counter electrode by irradiating the selected region of the photosemiconductor thin film with light to deposit the material on the selected region of the semiconductor thin film.

The present invention provides a light waveguide forming method including a step in which a film deposition substrate that has been formed by laminating a conductive thin film, an photosemiconductor thin film, and a peel layer in this order on an insulative substrate is disposed so that at least the photosemiconductor thin film of the film deposition substrate is in contact with an aqueous electrolyte solution containing film forming material having a property that solubility or dispersibility in a water solution decreases according to its pH, a voltage is applied between a selected region of the photosemiconductor thin film and a counter electrode by irradiating the selected region of the photosemiconductor thin film with light to deposit the material on the selected region of the semiconductor thin film, and a step in which the deposited material is transferred onto a light waveguide forming substrate.

A clad layer may be formed by use of a clad layer forming electrolyte solution, and a clad layer has been formed by use of a core layer forming electrolyte solution without drying the clad layer that has been formed precedently.

Without drying the clad layer and the core layer, a clad layer may be formed additionally on the core layer by use of a clad layer forming electrolyte solution.

The clad layer is formed on an entire surface by means of electrodeposition technique by applying a voltage higher than Schottky barrier of the photosemiconductor thin film of the light waveguide forming substrate or the film deposition substrate without light irradiation when the clad layer is formed.

The light waveguide forming substrate or the film deposition substrate may include a laminate having an photosemiconductor thin film on a conductive substrate.

A conductive material may be made up of at least any one composition selected from a group including iron and compounds of iron, nickel and compounds of nickel, zinc and compounds of zinc, copper and compounds of copper, titanium and compounds of titanium, and mixtures of these materials.

The present invention provides a light waveguide forming method including a step in which a light waveguide forming substrate that has been formed by laminating a conductive thin film or a patterned conductive film on an insulative substrate is disposed so that at least the conductive thin film of the light waveguide forming substrate is in contact with an aqueous electrolyte solution containing film forming material having a property that solubility or dispersibility in a water solution decreases according to its pH, and a voltage is applied between the conductive thin layer and a counter electrode to deposit the film forming material on the conductive thin film.

The present invention provides a light waveguide forming method including a step in which a film deposition substrate that has been formed by laminating a conductive thin film or a patterned conductive thin film, and a peel layer in this order on an insulative substrate is disposed so that at least the conductive thin film of the film deposition substrate is in contact with an aqueous electrolyte solution containing film forming material having a property that solubility or dispersibility in a water solution decreases according to its pH, a voltage is applied between the conductive thin film and a counter electrode to deposit the film forming material on the conductive thin film, and a step in which the deposited film forming material is transferred onto a light waveguide forming substrate.

The film forming material having a property that solubility or dispersibility in a water solution decreases according to its pH may be polymer material.

The clad layer forming electrolyte solution may contain the polymer material, and the core layer forming electrolyte solution may contain the polymer material and particles having a refractive index higher than that of the polymer material.

The core layer forming electrolyte solution may contain the polymer material, and the clad layer forming electrolyte solution may contain the polymer material and particles having a refractive index lower than that of the polymer material.

The clad layer forming electrolyte solution may contain the polymer material and particles having a refractive index lower than that of the polymer material, and the core layer forming electrolyte solution may contain the polymer material and particles having a refractive index higher than that of the polymer material.

The light waveguide forming substrate may be served as an anode, and the electrodeposition voltage may be equal to or lower than 5 V.

The present invention provides an electrolyte solution used in a light waveguide forming method containing film forming material having a property that solubility or dispersibility in a water solution decreases according to its pH, wherein the film forming material has hydrophobic group and hydrophilic group, and the percentage of the number of hydrophobic group to the total number of hydrophilic group and the number of hydrophobic group is in a range from 30% to 80%.

The electrolyte solution may contain particles additionally for controlling a refractive index.

The present invention provides a light waveguide forming apparatus provided with a light source for applying a light, an image forming optical system having a first image forming lens and a second image forming lens, a photomask inserted between the first image forming optical lens and the second image forming optical lens, a counter electrode, a unit that is capable of applying a bias voltage, and an electrodeposition tank filled with an electrolyte solution, wherein the light waveguide forming substrate or the film deposition substrate is disposed in the electrolyte solution tank.

The present invention provides a light waveguide having a core and a clad, at least one of the core and clad including an electrodeposited polymer material.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1A:
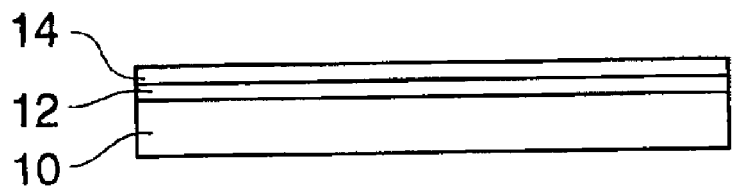
FIG. 1A to FIG. 1D show a light waveguide forming process described in Example 1.

The electrodeposition technique basically involves a method in which a patterned conductive thin film is formed on an insulative substrate, at least the conductive thin film is disposed so as to be in contact with an electrolyte solution that is an aqueous deposition liquid containing a film forming material, solubility or dispersibility of which film forming material decreases according to its pH in a water solution, a voltage is applied between the conductive thin film and a counter electrode to deposit the abovementioned material on the conductive thin film.

Furthermore, the photovoltaic electrodeposition technique basically involves a method that utilizes photovoltaic effect in which a laminate including conductive thin film and an photosemiconductor thin film is formed on an insulative substrate in this order, at least the photosemiconductor thin film is disposed so as to be in contact with an aqueous electrolyte solution containing film forming material, solubility or dispersibility of which film forming material decreases according to its pH in a water solution, a voltage is applied between the photosemiconductor thin film and a counter electrode by irradiating a selected region of the photosemiconductor thin film with a light to deposit the material on the selected region of the semiconductor thin film.

By applying the electrodeposition technique or photovoltaic electrodeposition technique, a light waveguide having a fine pattern is formed precisely without application of a high voltage (5 V or lower). Furthermore, it is required to form a thin film having a film thickness controlled precisely on a substrate and there is a problem that alkaline waste liquid is generated from etching process in the conventional method for forming a light waveguide by use of photosensitive resin. However, according to the present invention, the film thickness of a core layer and a clad layer is controlled easily by controlling the light irradiation time or the voltage application time, and etching process for forming a pattern is not necessary, and the load on the environment is lightened.

Furthermore, a trial is currently made for manufacturing a substrate on which an electronic circuit and optical circuit are mounted. In this case, the circuit that has been formed first would be damaged when the next circuit is etched for patterning. However, because an etching process is not necessary in the method for forming a light waveguide by means of photo electrodeposition technique of the present invention, such a problem will not be caused.

As described hereinabove, the method for forming a light waveguide of the present invention is simple, and suitable for mass-production and applicable to manufacturing of light waveguide type parts necessary for mass-production. In addition to the above, this method can be applied to manufacture various light waveguides, optical integrated circuits, and optical wiring boards used in the field of general optics and fine optics, and the field of optical communications and optical information processing.

At first, a method for forming a light waveguide by means of photovoltaic electrodeposition technique will be described hereunder. A laminate formed by laminating a conductive thin film and a photosemiconductor thin film in this order is used as the light waveguide forming substrate to be used in this method. The insulative substrate is formed of a glass plate, quartz plate, plastic film, or epoxy substrate, the conductive thin film is formed of ITO, indium oxide, nickel, or aluminum, and the photosemiconductor thin film is formed of an oxide titanium thin film as described hereinafter. In the case where a photosemiconductor thin film is irradiated with light through an insulative substrate, it is necessary that the insulative substrate and the conductive thin film are light-transmittable. However, in the case where a light is applied through an electrolyte solution, the abovementioned condition is not necessary.

Furthermore, the electrolyte solution is common to the electrodeposition technique that will be described hereinafter, and these subjects will be described hereinafter together.

The term "selected region" denotes not only the partial region of a light waveguide forming substrate but also an entire surface depending on the case. For example, in the case where a clad layer is formed on the entire surface of the substrate, the entire surface is irradiated with light.

A core layer and/or clad layer is formed according to the method of the present invention.

Furthermore, in the case where a clad layer and a core layer are formed one on another in the present invention, a clad layer is formed by use of a clad-forming electrolyte solution and a core layer is formed by use of a core-forming electrolyte solution without drying of the clad layer formed previously. As a matter of course, it is true for the inversed case. Furthermore, in the case of a laminate formed of a clad layer-core layer-clad layer, the clad layer can be formed on the core layer by use of the clad forming electrolyte solution without drying the clad layer and core layer that have been previously formed as described hereinabove. In the case where moisture is removed to dry the layer after photovoltaic electrodeposition, it is impossible to form a core layer or clad layer on the clad layer or core layer because the clad layer or core layer is insulative, but by operating as described hereinabove it is possible to retain conductivity of the electrodeposited film, and another layer can be formed on a core layer or clad layer.

In the case where a clad layer and a core layer are laminated according to the method of the present invention where the clad layer is formed over the entire surface, a clad layer is formed by irradiating a selected region (entire surface) of the light waveguide forming substrate or film forming substrate with light by use of clad forming electrolyte solution, and a core layer is then formed by irradiating the selected region (core forming region) with light by use of a core forming electrolyte solution without drying of the clad layer that has been formed. Furthermore, it is possible to form another clad layer on the core layer by irradiating the entire surface with light by use of a clad forming electrolyte solution without drying of the clad layer and core layer that have been formed as described hereinabove.

Furthermore, in the case where the abovementioned clad layer is formed, it is possible to form a clad layer by means of electrodeposition technique by applying a voltage higher than the Schottky barrier of the photosemiconductor thin film of the light waveguide forming substrate without light irradiation. In this case, the exposure process can be omitted in this method, which is simpler.

Herein, a method for forming a light waveguide of the present invention will be described with reference to the drawings.

Figure 1B:
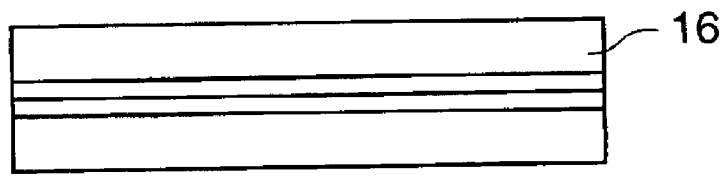
Figure 1C:
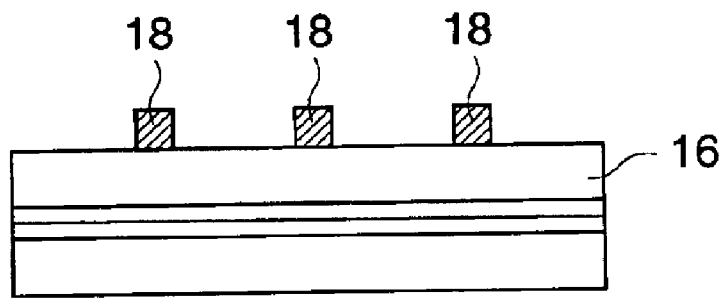
Figure 1D:
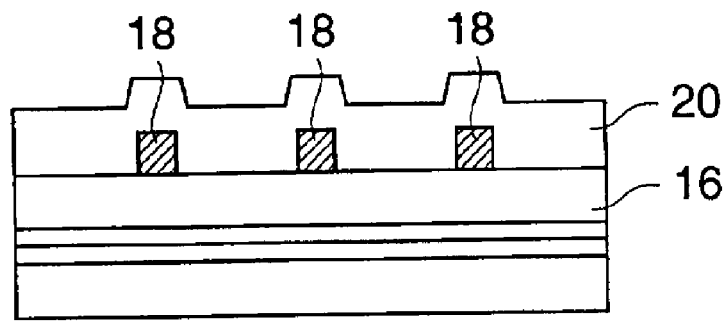

FIG. 1A to FIG. 1D show a process for forming a light waveguide having a clad layer formed on the entire surface of a substrate. FIG. 1A shows an example of a light waveguide forming substrate, wherein 10 denotes an insulative substrate, 12 denotes a conductive film, and 14 denotes an photosemiconductor thin film. FIG. 1B is a diagram of a laminate formed by depositing a clad layer 16 (not dried) on a photosemiconductor thin film by irradiating the entire surface with light by use of clad layer forming liquid or by applying a voltage higher than the Schottky barrier of the photosemiconductor thin film without light irradiation. FIG. 1C shows a laminate formed by irradiating the selected region with light by use of core layer forming electrolyte solution to deposit a core layer 18 on a selected region of the moist clad layer. Furthermore, FIG. 1D shows a laminate having a clad layer 20 (moist) on the moist core layer 18 formed by irradiating the entire surface with light by use of clad layer forming electrolyte solution or by applying a voltage higher than the Schottky barrier of the photosemiconductor thin film without light irradiation. Thereafter, the layers are dried to form a light waveguide.

Next, an exemplary forming of a light waveguide having a clad layer that does not cover an entire surface of the light waveguide forming substrate is described with reference to the drawings.

Figure 2A:
FIG. 2A to FIG. 2E show a light waveguide forming process described in Example 3.
Figure 2B:
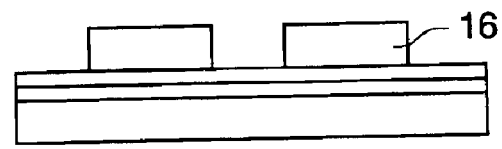
Figure 2C:
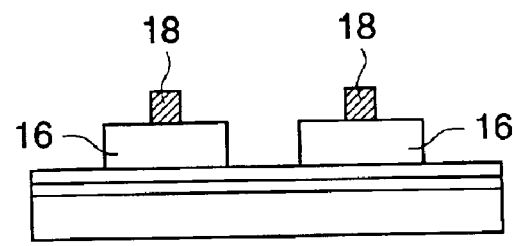
Figure 2D:
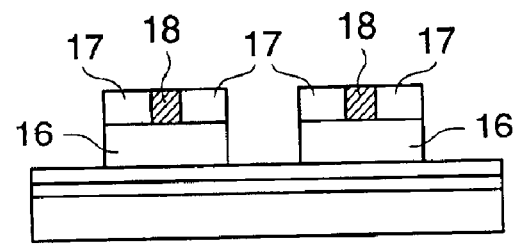
Figure 2E:
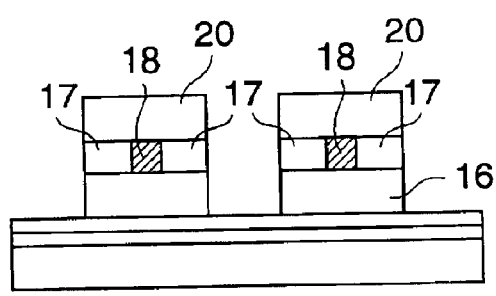

FIG. 2A to FIG. 2E show an exemplary forming of a light waveguide having a clad layer that does not cover the entire surface of the substrate. FIG. 2A shows the light waveguide forming substrate like that shown in FIG. 1A. FIG. 2B shows a diagram of a laminate having a bottom clad layer 16 (moist) formed on an photosemiconductor thin film by irradiating a selected region with light by use of clad layer forming electrolyte solution. FIG. 2C shows a laminate having a core layer 18 formed on a selected region of the moist bottom clad layer 16 by irradiating the selected region with light by use of core layer forming electrolyte solution. Furthermore, FIG. 2D shows a diagram of a laminate having a side clad layer 17 formed on the side face of the moist core layer 18 by irradiating a selected region with light by use of clad layer forming deposition liquid. Furthermore, FIG. 2E shows a laminate having a top clad layer 20 formed on the moist clad layer 17 and the core layer 18 by irradiating a selected region with light by use of clad layer forming electrolyte solution.

In this embodiment, it is possible to form optical functional parts such as light waveguide and micro-lens array by applying the same photovoltaic electrodeposition process on the region of the light waveguide forming substrate where the clad layer does not cover. Furthermore, the obtained light waveguide is excellent in precision, and it is easy to provide optical functional parts on the top of the light waveguide that is excellent in precision by applying another process because the top of the light waveguide is flat.

Furthermore, a laminate formed by depositing a photosemiconductor thin film on the conductive substrate may be used as the light waveguide forming substrate in the photovoltaic electrodeposition technique. At least one of compounds selected from a group including iron and compounds of iron, nickel or compounds of nickel, zinc and compounds of zinc, copper and compounds of copper, titanium and compounds of titanium, and mixtures of these materials may be used as the material of the conductive substrate. Otherwise, conductive plastic films may be used as the conductive substrate.

Furthermore, in the case where the photosemiconductor is formed of titanium oxide or zinc oxide, the photosemiconductor thin film is formed by means of a method as described hereinafter, and otherwise, a photosemiconductor thin film may be formed on the surface of a plate by oxidizing the surface of a metal titanium plate or metal zinc plate. In this case, the light waveguide forming substrate or film deposition substrate is formed of a conductive substrate and an photosemiconductor thin film disposed thereon.

An inexpensive method such as high temperature heat treatment in the air or anode oxidation treatment may be employed as the oxidation process, and it is possible to form a light transmissive semiconductor thin film without employing an expensive sputtering technique. It is desired that the region of the under layer metal substrate that has not been subjected to an oxidation treatment is subjected to an insulation film forming treatment to avoid forming of needless electrodeposition film.

Next, a method for forming a light waveguide by means of electrodeposition technique will be described hereunder.

In this method, a light waveguide forming substrate having an insulative substrate on which a conductive thin film or a patterned conductive thin film is formed is used, and an aqueous electrolyte solution containing film forming material having the solubility or dispersibility in the water solution decreases according to its pH is used. At least the conductive thin film is disposed so as to be in contact with the electrolyte solution, and a voltage is applied between the conductive thin film and the counter electrode to deposit the material on the conductive thin film.

The same insulative substrate as used in the case of the photovoltaic electrodeposition technique is used. Furthermore, the patterned conductive thin film may be formed by patterning a conductive thin film by means of a popular method. Alternatively, it may be formed by a method in which insulation film is coated with leaving the portion necessary for the conductive substrate uncoated, and the patterned conductive portion is exposed. A clad layer or core layer is formed by means of the electrodeposition technique by use of these substrates.

Next, a method for transferring a light waveguide formed as described hereinabove on another substrate will be described.

At first, a method in which a light waveguide formed by means of the photovoltaic electrodeposition technique as described hereinabove is transferred on a light waveguide forming substrate will be described. A light waveguide formed by means of the electrodeposition technique, a single core layer, a single clad layer, or a laminate having a clad layer and core layer is transferred onto another substrate. A substrate that functions as a clad layer is used as the substrate. Thereby, the total number of processes including an electrodeposition process can be reduced. However, in the case where a core layer and a clad layer are formed separately by means of the electrodeposition technique and a light waveguide is formed by repeating the transfer process, the possibility of the loss of the interface between the core layer and clad layer as well as the possibility of deformation of the configuration of the light waveguide increases slightly because the transferring process is repeated.

A glass substrate or epoxy substrate that is used popularly may be used as the light waveguide forming substrate. Polyolefin film such as polyethylene film, polyester film, polycarbonate film, acrylic resin film, and fluoridized polymer film may be used as the light waveguide forming substrate that functions also as a clad layer.

Figure 3A:
FIG. 3A to FIG. 3F show a light waveguide forming process described in Example 9.
Figure 3B:
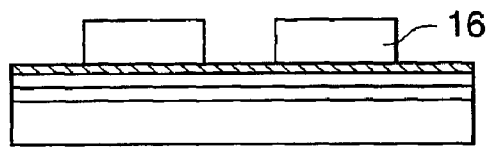
Figure 3C:
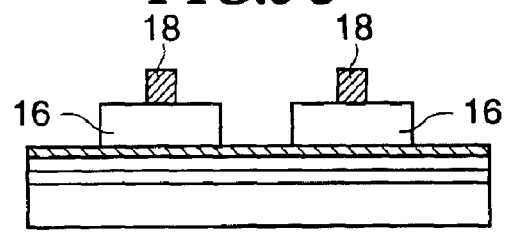
Figure 3D:
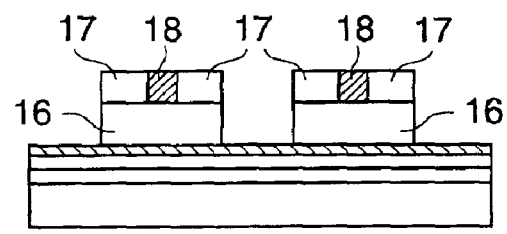
Figure 3E:
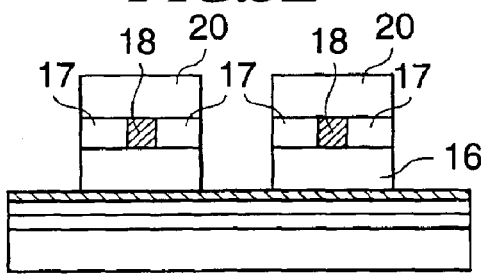

An embodiment for transferring a light waveguide onto a substrate will be described with reference to FIG. 3A to FIG. 3F. FIG. 3A shows an exemplary film deposition substrate, where 10 denotes an insulative substrate, 12 denotes a conductive thin film, 14 denotes a photosemiconductor thin film, and 13 denotes a peel layer. A bottom clad layer 16, a core layer 18, a side clad layer 17, and a top clad layer 20 (refer to FIG. 3B to FIG. 3E) are formed as described with reference to FIG. 2B to FIG. 2E by use of the film deposition substrate, next a substrate 30 is placed on the top clad layer 20, and the laminate is subjected to press heat treatment. Thereafter, the bottom clad layer is delaminated from the peel layer to form a light waveguide (refer to FIG. 3F).

Otherwise, a clad layer or a core layer formed by means of the electrodeposition technique may be transferred onto another substrate. It is advantageous to use the substrate that functions as a clad layer in this case.

Figure 4A:
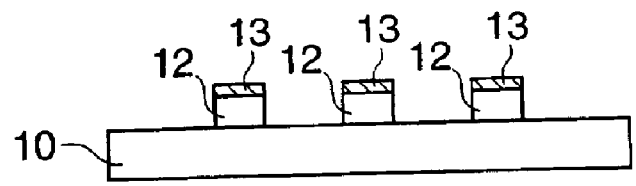
FIG. 4A to FIG. 4D show a light waveguide forming process described in Example 11.
Figure 4B:
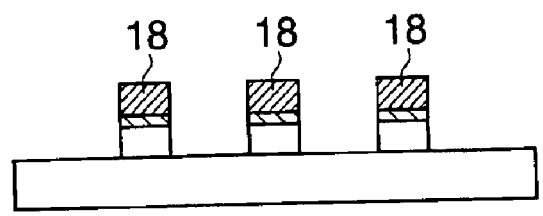

An embodiment of a method in which a core layer is formed by means of the electrodeposition technique and then transferred onto a substrate that functions also as a clad layer is shown in FIG. 4A to FIG. 4D. In FIG. 4A, 10 denotes an insulative substrate, 12 denotes a patterned conductive thin film, and 13 denotes a peel layer. Next, a core layer 18 is formed on the patterned conductive thin film 12 as described hereinabove (refer to FIG. 4B), a substrate 32 that functions also as a clad layer is placed on the obtained core layer to form a laminate, the laminate is subjected to press heat treatment and then delaminated between the peel layer and the core layer (refer to FIG. 4C). Thereafter, a substrate 34 that functions as another clad layer is placed on the surface of the core layer 18 to form a laminate, and the laminate is subjected to press heat treatment to form a light waveguide (refer to FIG. 4D).

Because the peel layer is provided on the film deposition substrate in the abovementioned photovoltaic electrodeposition technique and electrodeposition technique, it is not necessary to apply the heat and pressure intensively when the light waveguide is transferred onto the substrate, and the substrate and light waveguide are protected from being damaged.

A peel layer having a critical surface tension of 30 dyne/cm or lower that does not adversely affect an electrodeposition current is preferably used. In detail, commercially available waterproofing fluorine resin spray may be used. Alternatively, silicone resin or silicone oil may be used. Furthermore, a thin film of unsaturated fatty acid such as oleic acid may be used preferably.

Furthermore, in the abovementioned photovoltaic electrodeposition technique and electrodeposition technique, the refractive index of the clad layer and core layer is controlled by using film forming material having a different refractive index, by adding refractive index-controlling particles to the electrolyte solution, or by combining these two techniques. The refractive index will be described in the description of the electrolyte solution.

The light waveguide forming electrolyte solution used in the abovementioned photovoltaic electrodeposition technique and electrodeposition technique will be described in detail hereunder.

The electrolyte solution of the present invention contains film forming material having the solubility or dispersibility in a water solution changes at least according to its pH. If one or more materials have such an electrodeposition property, when various refractive index-controlling materials that cannot form a thin film alone is dispersed in the electrolyte solution, the refractive index-controlling material is taken in the electrodeposition material when a film is formed and fixed in the light waveguide.

A film forming material having solubility or dispersibility in a water solution that decreases according to its pH preferably contains a material having a group that changes in the ion dissociation (ionic group) by changing the pH of the liquid such as carboxyl group or amino group. However, the ionic group is not an absolute necessity for the material. Furthermore, the polarity of the ion is not important.

The film forming material having the solubility or dispersibility in a water solution that decreases according to its pH preferably has the abovementioned property from the view point of the mechanical strength of the thin film (light waveguide). Examples of such a polymer material include polymer material having ionic group (ionic polymer) as described hereinabove.

It is required that the ionic polymer is sufficiently dissolvable or dispersible in a water solution (including an water solution ph of which has been adjusted) and is light-transmittable.

The polymer molecule preferably has hydrophilic group and hydrophobic group in a molecule to have the function that solubility or dispersibility in a water solution decreases according to its pH, and it is preferable that the polymer molecule has ionizable group (simply referred to as "ionization group" hereinafter) such as carboxyl group (anionic group) or amino group (cationic group) as the hydrophilic group. For example, in the case of polymer material having carboxyl group, carboxyl group is dissociated in the alkaline pH region and the polymer is dissolved in a water solution, and on the other hand carboxyl group is associated in the acidic pH region and the polymer loses the solubility and is deposited.

The hydrophobic group of the polymer gives the polymer the function that a film is instantly deposited concomitantly with losing of ionic property of the group that has been dissociated into ions according to its pH as described hereinabove. Furthermore, the hydrophobic group is capable of adsorbing refractive index controlling particles in application of the light waveguide forming technique of the present invention, which will be described hereinafter, and renders the polymer dispersible. On the other hand, examples of hydrophilic group include hydroxyl group in addition to ionization groups.

The percentage of hydrophobic group in the polymer having hydrophobic group and hydrophilic group preferably ranges from 30% to 80% based on the total number of hydrophilic group and hydrophobic group. If the percentage of the number of hydrophobic group is less than 30% based on the total number of hydrophilic group and hydrophobic group, a film that has been formed is re-dissolved easily and the water-resistance and film strength can be insufficient. On the other hand, if the percentage of the number of hydrophobic group is more than 80% based on the total number of hydrophilic group and hydrophobic group, the solubility of the polymer in a water solution is insufficient, the electrolyte solution is turbid, the material is precipitated, and the viscosity of the electrolyte solution increases. Therefore, the abovementioned range is preferable. The percentage of hydrophobic group is in the range from 55% to 70% based on the total number of the hydrophilic group and the hydrophobic group more preferably. The polymer having ionization group in the abovementioned preferable range is high in the film deposition efficiency particularly, and the liquid property of the electrolyte solution is stable. Furthermore, a film can be formed by applying a low electrodeposition voltage like photovoltaic effect.

Examples of the polymer material include, for example, copolymers formed by copolymerization of polymerizable monomer having hydrophilic group and polymerizable monomer having hydrophobic monomer.

In detail, examples of polymerizable monomer include methacrylic acid, acrylic acid, hydroxyethyl methacrylate, acrylamide, maleic anhydride, fumaric acid, propionic acid, itaconic acid, and derivatives of these monomers, but the polymerizable monomer having hydrophilic group is by no means limited to the abovementioned monomers. Particularly, methacrylic acid and acrylic acid are preferably used among the abovementioned monomers because the film deposition efficiency due to pH change is high, and which is useful hydrophilic monomer.

Furthermore, examples of the polymerizable monomer having hydrophobic group include alkene, styrene, a-methylstyrene, a-ethylstyrene, methylmethacrylate, butylmethacrylate, acrylonitrile, vinylacetate, ethylacrylate, butylacrylate, laurylmethacrylate, and derivatives of these monomers, but the polymerizable monomer having hydrophobic group is by no means limited to the abovementioned monomers. Particularly, styrene and a-methylstyrene are useful monomers because the hysteresis characteristic of re-dissolution is easily obtained due to strong hydrophobic property of these monomers.

Copolymers that are formed of acrylic acid or methacrylic acid, which is used as the hydrophilic monomer, and styrene or a-methylstyrene, which is used as the hydrophobic monomer, are preferably used as the polymer material used in the light waveguide forming technique of the present invention.

The polymer material used in the light waveguide forming technique of the present invention is formed of a polymerizable monomer having hydrophilic group and polymerizable monomer having hydrophobic group, preferably the percentage of number of hydrophilic group to the number of hydrophobic group in a polymer molecule is controlled so that the percentage is adjusted to the abovementioned percentage when monomers are copolymerized to form the polymer material. The type of hydrophilic group and hydrophobic group is by no means limited to one type respectively.

Accroding to the light waveguide forming method of the present invention, a step may preferably included in which a light waveguide is heated after the step of forming the all light waveguide. By incorporating this step, transmittance loss of the light waveguide may be decreased.

At this time, the phrase "all light waveguides" means that at least one light waveguide or all light waveguides when at least one waveguide or plural waveguide, i.e. one or more core layers and one or more crud layers, are formed. The phrase "after the step of forming the all waveguide" means that "after a deposition of the light waveguide is completed where the deposited material formed on the substrate by (photo) voltaic deposition process is used as an light waveguide by itself. However, since the heating process may preferably completed after a water removing process removing water form the deposited light waveguide, the phrase generally means that after the water removing process is completed. When a light waveguide forming process by transferring a deposited light waveguide to another optical supporting member is adopted, the phrase means that after the transferring process is completed.

The deposited light waveguide formed by (photo)voltaic deposition method usually contains water in the deposited layer, therefore, water in the deposited film is removed by the heating process od the deposited layer. At his time the removed water make a deposited layer defective, i.e. pinhole, the defect may increases a transmittance loss of the light waveguide. Therefore, by incorporating a heating process of the present invention, the aforementioned defects in the deposited film may be restored and the surface roughness between the core and crud layers or a surface of the deposited light waveguide may be improved to decrease the transmittance loss.

The aforementioned heating process may be a heating process capable of decreasing a transmittance loss of the raw deposited film, therefore, there are no limitation for the heating temperature or heating time. To determine a heating temperature, glass transition temperature or fluidized temperature of the polymer materials as the deposited materials may be considered.

In addition, to effectively complete the heating process, the heating temperature may be equal or high of the fluidized temperature of the polymer material. The fluidized temperature is defined by "a temperature where the fluidization is initiated" described in "Kobunshi Shiken-Hou(Kobunshi-Kagaku Koza Vol., 14, pp364–369, edited by Kobunshi-Gakkai, 1963). The fluidized temperature used for the present invention is generally from 50° C. to 200° C., preferably 80° C. to 150° C., more preferably 110° C. to 130° C. If a pressure is applied to the deposited optical during the heating process, heating time and/or heating temperature may be decreased.

Furthermore, cross-linkable group may be introduced into the polymer material used in the present invention to form cross-linkable polymer. The cross-linkable polymer is subjected to heat treatment to form crosslinking after a light waveguide is formed, and the mechanical strength and heat resistance of the light waveguide are improved.

Examples of cross-linkable group include epoxy group, block isocyanide (including a group that can change to isocyanide group), cyclocarbonate group, and melamine group. Therefore, a polymer formed by copolymerization of polymerizable monomer having cross-linkable group, polymerizable monomer having hydrophilic group, and polymerizable monomer having hydrophobic group may be preferably used as the abovementioned polymer material.

Examples of the polymerizable monomer having cross-linkable group include, for example, glycidyl(metha)acrylate, (metha)acrylic acid azide, methacrylic acid 2-(O-[1'-methlpropylidene amide] carboxyl amino) ethyl (product of SHOWA DENKO) (brand name: Karenz MO1-BN), 4-((metha)acryloyloxymethyl)ethylene carbonate, and (metha) acryroyl melamine. The cross-linkable monomer is contained in electrodeposition polymer compound in an amount of 1 to 20 mol % generally though depending on the type of used monomer.

The degree of polymerization of the abovementioned polymer material preferably ranges from 6,000 to 25,000 to obtain polymer material that is excellent in film forming capability. More preferably, the degree of polymerization ranges from 9,000 to 20,000. If the degree of polymerization is lower than 6,000, the film is rendered very re-dissolvable. On the other hand, if the degree of polymerization is higher than 25,000, the solubility in a water solution is insufficient, the liquid is turbid or causes precipitation problematically.

Furthermore, in the case where the polymer material has anionic group such as carboxyl group, the acid number of the polymer material in the range from 60 to 300 is preferable to obtain excellent electrodeposition characteristic. The range from 90 to 195 is more preferable. If the acid number is smaller than 60, the solubility in a water solution is insufficient, the solid concentration in an electrolyte solution cannot be higher than a suitable value, the liquid can be turbid and causes precipitation, and the liquid viscosity can be too high, resulting in problems. On the other hand, if the acid number is higher than 300, a film formed by deposition is easily re-dissolved. Therefore, the abovementioned range is suitable.

It is preferable that the polymer material that is dissolved or dispersed generates a supernatant liquid and is precipitated according to its pH of the electrolyte solution in which the polymer material is dissolved or dispersed, and such a liquid change caused concomitantly with pH change occurs within pH range of 2. When the pH range is equal to or smaller than 2, there are created positive effects such as an electrodeposition film can be deposited instantaneously when pH changes sharply, the cohesion of the electrodeposition film to be deposited is high, and the re-dissolving speed into the electrolyte solution is reduced. Thereby, a light waveguide having low transmission loss and high resolution is obtained.

If the pH range is larger than 2, the electrodeposition speed can be too slow to obtain the sufficient thin film structure, and the water resistance of the electrodeposition film can be poor (result in reduced resolution). The pH rage is within 1 more preferably.

Furthermore, the electrolyte solution in which abovementioned polymer material is dissolved causes state change of precipitation corresponding to pH value change very rapidly, and in addition to the abovementioned advantage the film formed from such an electrolyte solution is resistant to re-dissolution preferably. This characteristic is called as hysteresis characteristic, for example in the case of anionic polymer material, the reduction of pH causes deposition sharply, but the film is re-dissolved not sharply even though pH rises (for example, after electrodeposition is completed), and the deposited film remains unchanged for a certain time. On the other hand, in the case of polymer material that does not exhibits hysteresis characteristic, the solubility increases when pH rises only slightly, and the deposited film is easily re-dissolved.

The polymer material having the abovementioned characteristic can be obtained by controlling the type of hydrophilic group and hydrophobic group, balance between hydrophilic group and hydrophobic group, acid number, and molecular weight. The abovementioned materials can be mixed to prepare the polymer material contained in an electrolyte solution of the present invention as long as the thin film forming effect is maintained. Examples of mixed polymer material include a mixture of molecules having the same polarity such as a mixture of two or more anionic molecules or a mixture of molecules having different polarity such as a mixture of anionic molecules and cationic molecules.

Next, the conductivity of an electrolyte solution will be described hereunder. The conductivity relates to electrodeposition speed, namely, amount of electrodeposition. Higher conductivity brings about a thicker film thickness of an electrodeposition film deposited in a certain time, and saturates at a value of about 20 mS/cm. Therefore, in the case where the conductivity is insufficient with only polymer material, the electrodeposition speed can be controlled by adding, for example, $NH^{+4}$ ions or $Cl^-$ ions, which is inert on electrodeposition. Usually, support salt is added to increase the conductivity of an electrolyte solution. Examples of support salt used generally in the electrochemical field include alkali metal salts such as NaCl and KCl, ammonium chloride, ammonium nitrate, and tetra-ammonium salt such as tetraethyl-ammonium perchlorate ($Et_4NClO_4$). These support salts may be used in the present invention.

However, because alkali metal salt adversely affects the characteristic of a thin film transistor, an electrolyte solution containing alkali metal salt cannot be used in the case where a light waveguide is formed by overlapping on a substrate on which a thin film transistor is provided. Therefore, in this case, ammonium salts such as $NH_4Cl$ and $NH_4NO_3$, and tetraalkyl-ammonium salts such as $Et_4NClO_4$, $n-Bu_4NClO_4$, $Et_4NBF_4$, $Et_4NBr$, and $n-Bu_4NBr$ may be used preferably. These compounds does not adversely affect the transistor characteristic even though an electrolyte solution contains these compounds.

As a matter of course, the thin film forming is influenced by pH of an electrolyte solution. For example, if a thin film is formed by means of electrodeposition technique under the condition that the solubility of electrodeposition molecule saturates before thin film is formed, the formed thin film remains not re-dissolved. However, if a thin film is formed at pH of unsaturated liquid, the formed thin film starts to be re-dissolved immediately when light irradiation is stopped. Therefore, because it is preferable that a thin film is formed at pH of the liquid saturated up to the solubility, it is required to adjust an electrolyte solution to the desired pH by adding acid or alkali.

The refractive index of electrodeposited polymer described above is in the range from 1.45 to 1.6, the electrodeposited thin film is transparent and has no absorption band in the wavelength range from 0.8 to 1.6 $\mu$m, which is used for the light waveguide, and the abovementioned polymer is used preferably as light waveguide material.

Furthermore, because an electrolyte solution formed by dissolving the polymer material in water does not absorb ultraviolet rays, pattern ultraviolet rays can be applied onto an photosemiconductor through the electrolyte solution. Furthermore, because a thin film is formed by means of the electrodeposition technique with a voltage as low as 5 V or lower than 5 V, it is possible to form an electrodeposition pattern by applying the photovoltaic effect of an photosemiconductor.

For example, in the case where a core layer and a clad layer are formed by use of the same electrodeposition polymer, a method for differentiating the refractive index between the core layer and clad layer will be described hereunder.

(1) An electrolyte solution containing the abovementioned electrodeposition polymer is used as a clad layer forming electrolyte solution, on the other hand an electrolyte solution containing the same polymer and additional particles having a refractive index higher than that of the electrodeposition polymer is used as a core layer forming electrolyte solution.

(2) The abovementioned electrodeposition polymer is used as a core layer forming electrolyte solution, on the other hand an electrolyte solution containing the same polymer and additional particles having a refractive index lower than that of the electrodeposition polymer is used as a clad layer forming electrolyte solution.

(3) An electrolyte solution containing the same polymer and additional particles having a refractive index higher than that of the electrodeposition polymer is used as a core layer forming electrolyte solution, and an electrolyte solution containing the same polymer and additional particles having a refractive index lower than that of the electrodeposition polymer is used as a clad layer forming electrolyte solution.

Furthermore, it is possible to adjust the refractive indexes of a clad layer and a core layer by use of two types of electrodeposition polymer materials having different refractive indexes or by use of two types of electrodeposition polymer materials containing refractive index adjusting particles additionally.

Next, the particle used for adjusting the refractive index of a layer to be added to an electrolyte solution will be described hereunder.

The number average particle diameter of the particle is preferably in the range from 0.2 to 150 nm from the view point of the dispersibility to an electrolyte solution and the transparency of an electrodeposition film, and is more preferably in the range from 2 to 20 nm. If the number average particle diameter is smaller than 0.2 nm, the smaller diameter results in high production cost and unstable quality of the product, on the other hand if the number average particle diameter exceeds 150 nm (1/10 of 1.5 µm that is in the range of wavelength band used for communication), the larger diameter results in reduced transparency and internal irregular reflection, and further results in the increased internal loss.

Examples of particle having a high refractive index to be added to core layer forming electrolyte solution include titanium oxide and zinc oxide, and on the other hand examples of particle having a low refractive index to be added to clad layer forming electrolyte solution include fluorine compound such as magnesium fluoride typically.

Next, an photosemiconductor thin film used in the present invention will be described hereunder. Basically, any transparent thin film semiconductor can be used as the photosemiconductor thin film used for the photovoltaic electrodeposition technique as long as the transparent thin film semiconductor generates an electromotive force when irradiated with a light. In detail, examples of the semiconductor include GaN, diamond, c-BN, SiC, ZnSe, $TiO_2$, and ZnO. Titanium oxide has no absorption band in the wavelength region higher than 400 nm and is used preferably among the abovementioned examples.

Examples of method for depositing a titanium oxide thin film on a substrate include thermal oxidation technique, sputtering technique, electron beam evaporation technique (EB technique), ion plating technique, and sol-gel technique, and n-type semiconductor having excellent characteristic is obtained by applying any one of these techniques.

However, in the case where plastic film with low heat resistance is used as the substrate or in the case where a light waveguide is formed by overlapping on a substrate on which TFT is provided, it is required to select suitable film forming technique that does not adversely affect the plastic or TFT. Though the sol-gel technique gives titanium oxide having high optical activity as the photosemiconductor, because it is required to sinter at a temperature of 500° C., it is difficult to form a titanium oxide film on a substrate in the case where a plastic film substrate having a heat resistance temperature of 200° C. is used and in the case where a substrate on which TFT having a heat resistance temperature of 250° C. is used.

Therefore, in the case where a plastic film substrate is used, a film forming technique that is capable of forming film at a temperature as low as possible, preferably at a temperature lower than 200° C., with limited damage on the substrate is used. The sputtering technique is used preferably, and RF sputtering technique is more preferably used from the abovementioned view point. (The electron beam technique and ion plating technique are not preferable because a substrate is heated at a temperature around 200° C. necessarily)

In the case where a substrate having TFT is used, sputtering technique, electron beam heating technique, or a method in which a titanium oxide thin film is formed at a low temperature by use of thin film forming coating liquid (product of TOTO LTD. or NIPPON SODA CO., LTD.) containing dispersed titanium oxide particle photocatalyst (lift-off technique by use of photoresist) may be employed.

RF sputtering technique is used preferably to form an anatase-type titanium oxide thin film having high optical activity, and a high photovoltaic effect is obtained.

The film thickness of an photosemiconductor thin film ranges preferably from 0.05 µm to 3 µm to obtain excellent characteristic. If the film thickness is thinner than 0.05 µm, the light absorption is insufficient, on the other hand if the film thickness exceeds 3 µm, cracking of the film is caused and the film forming property is poor. Therefore, the abovementioned range is suitable.

Furthermore, in the case where an photosemiconductor thin film is formed of titanium oxide or zinc oxide, a substrate having an photosemiconductor thin film on the surface is obtained by oxidizing a plate of titanium or zinc as described hereinabove.

Next, a light waveguide forming apparatus will be described.

In the photovoltaic electrodeposition technique of the present invention, the method for selectively irradiating an photosemiconductor thin film with light is by no means limited particularly, a method in which a photomask is used or laser exposure technique may be used, but the photomask is used preferably from the view point of precision and handling.

Figure 5:
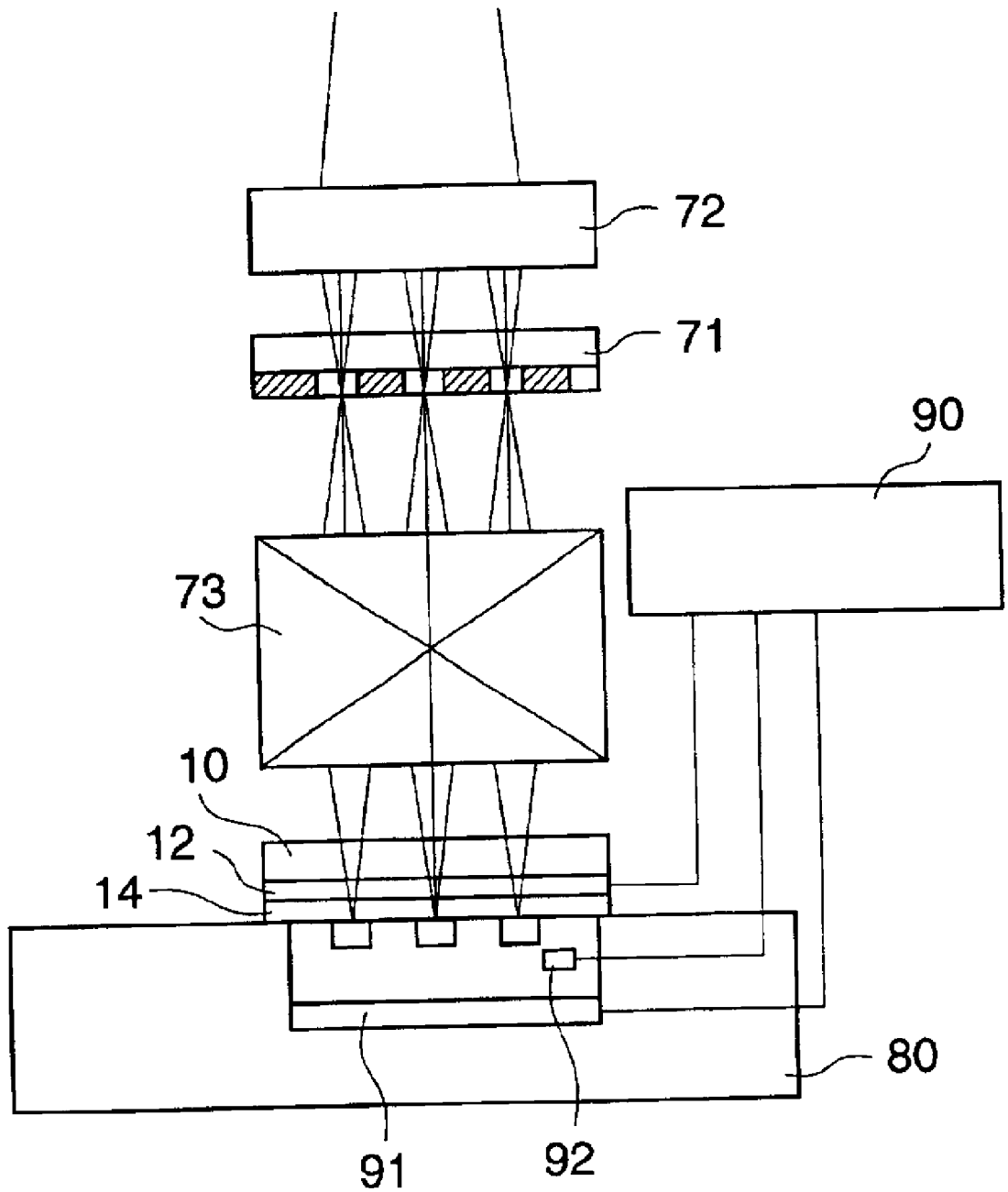
FIG. 5 shows a light waveguide forming apparatus in which a projection exposure device is used.

FIG. 5 is a conceptual diagram showing a light waveguide forming apparatus that forms a light waveguide by means of the photovoltaic electrodeposition technique by use of a photomask. The light waveguide forming apparatus shown in FIG. 5 is provided with a light source (not shown in the drawing) that applies ultraviolet rays, an imaging optical system having a first imaging optical lens 72 and a second imaging optical lens 73, a photomask 71 inserted between the first imaging optical lens and the second imaging optical lens, an electrodeposition tank 80 that is filled with electrolyte solution, a unit 90 served for applying a voltage such as potentiostat, a counter electrode 91, and a reference electrode 92 such as saturated calomel electrode. A mirror reflection optical system may be used instead of the abovementioned imaging optical system in the light waveguide forming apparatus. As shown in FIG. 5, a light waveguide forming substrate is disposed in the electrodeposition tank of the apparatus. By using the abovementioned projection optical system, a pattern exposure is imaged on the photosemiconductor thin film, and the resolution of the light waveguide is improved within a short exposure time.

Furthermore, the distance between the imaging optical lens of the imaging optical system and the light-transmittable substrate surface is preferably in the range from 1 mm to 50 cm from the view point of handling, and the focal depth is preferably in the range from ±10 to ±100 µm from the view point of the precision and handling.

Figure 6:
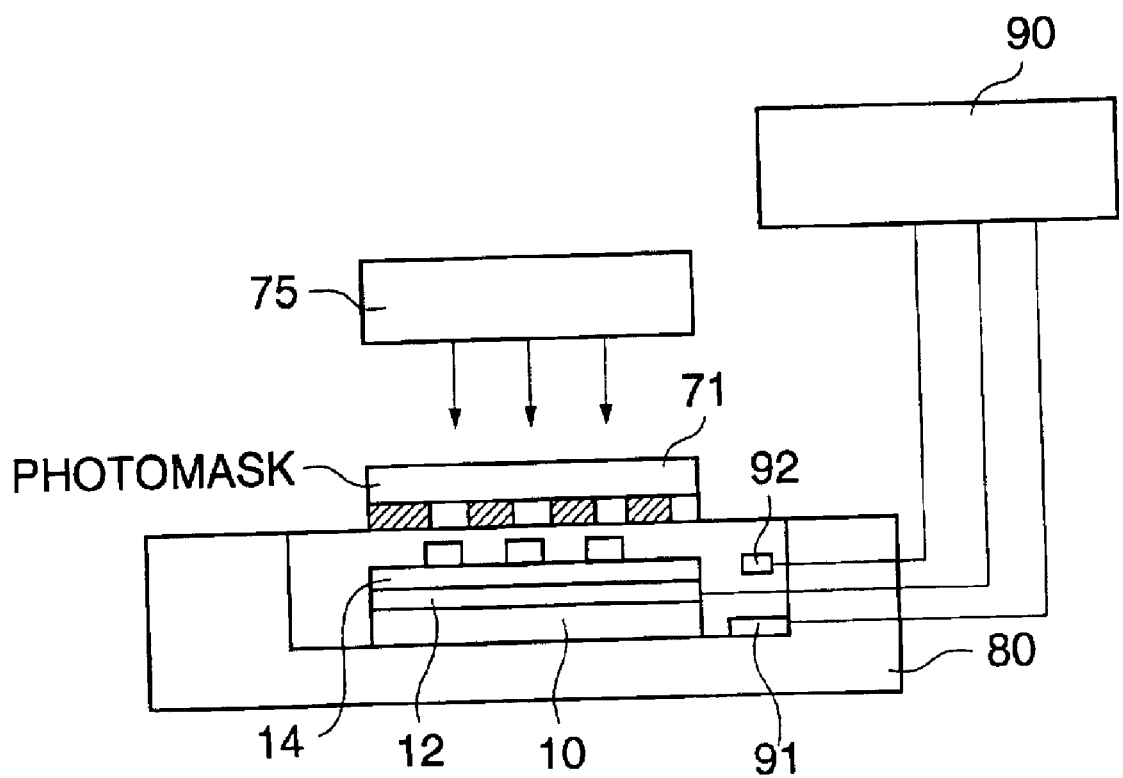
FIG. 6 shows a light waveguide forming apparatus in which a contact type exposure device is used.

Furthermore, in the case where the photomask is located near the photosemiconductor thin film, it is not necessary to use the apparatus provided with an exposure device having an imaging optical system or mirror reflection optical system as described hereinabove, light irradiation is performed by use of a parallel light or contact-type exposure device. For example, a Hg—Xe uniform irradiation light source may be used as the irradiation light source. For example, as shown in FIG. 6, a Hg—Xe uniform irradiation light source 75 is used, the photomask 71 is located very near to the liquid surface, and the light waveguide forming substrate is disposed near the photomask. Thereby, it is possible to form a fine pattern. In this case, the depth of the electrolyte solution on the light waveguide forming substrate is preferably as shallow as possible.

Otherwise in the case where the photosemiconductor thin film is exposed through an insulative substrate, the thickness of the insulative substrate is made equal to 0.2 mm or thinner to prevent the light from being diffracted, and the photomask is placed closely to the substrate for exposure to obtain a pattern excellent in the resolution. A plastic film is used preferably as the insulative substrate having a thickness equal to or thinner than 0.2 mm.

Figure 7:
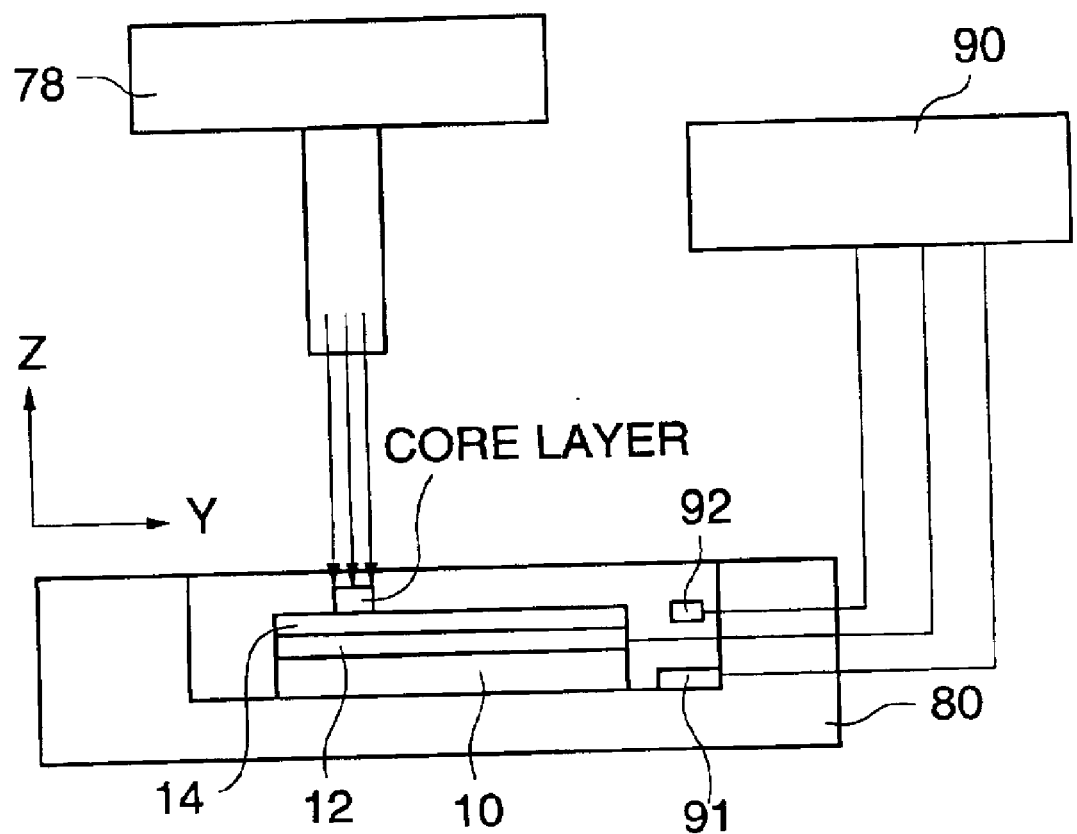
FIG. 7 shows a light waveguide forming apparatus in which a scanning type laser exposure device is used.

As a matter of course, if a long exposure time is allowed, it is possible to use a scanning type laser writing device for light irradiation because it is inexpensive. FIG. 7 is a conceptual diagram showing a device for irradiating a selected region with light by use of a laser light. The apparatus is provided with a scanning type laser writing device 78 that applies a laser beam such as He—Cd laser, an electrodeposition tank 80 that is filled with electrolyte solution, a unit 90 served for applying a voltage such as potentiostat, a counter electrode 91, and a reference electrode 92 such as saturated calomel electrode.

Otherwise in the allowable range of the pattern resolution, it is possible to use a proximity type exposure device because it is inexpensive.

In the case of the photovoltaic electrodeposition technique, light may be applied from the insulative substrate side of the light waveguide forming substrate or the film deposition substrate or from the photosemiconductor thin film side. In the case where light is applied from the photosemiconductor thin film side, though the substrate is dipped in the electrolyte solution, the photosemiconductor thin film can be exposed to light through the electrolyte solution because the electrolyte solution used in the present invention does not absorb ultraviolet rays that are used for light irradiation. FIG. 5 shows the case in which a light is applied from the insulative substrate side, FIG. 6 and FIG. 7 show the case in which light is applied from the photo-semiconductor thin film side.

Furthermore, in the case where a sufficient electromotive force for electrodeposition is obtained from the photosemiconductor, it is not necessary to apply a bias voltage by means of a voltage application device.

Figure 8:
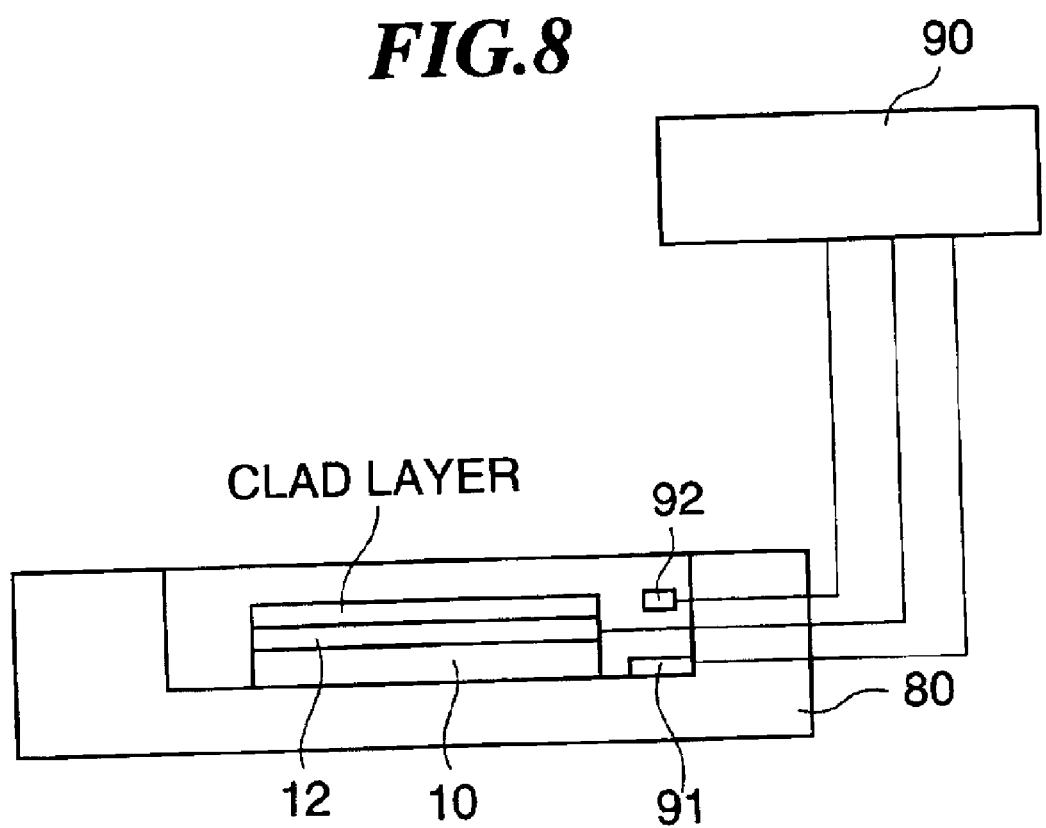
FIG. 8 shows a light waveguide forming apparatus in which an electrodeposition device is used.

Furthermore, FIG. 8 is a conceptual diagram showing an apparatus for forming a light waveguide by means of the electrodeposition technique. The apparatus is provided with an electrodeposition tank 80 that is filled with electrolyte solution, a unit 90 served for applying a voltage such as potentiostat, a counter electrode 91, and a reference electrode 92 such as saturated calomel electrode. FIG. 8 shows the conductive film formed so as to cover the entire surface of the substrate to form a clad layer.

The voltage application device is concatenated to the conductive thin film as shown in FIG. 5 to FIG. 8, but the photosemiconductor thin film functions as a working electrode in the case of the photovoltaic electrodeposition technique.

EXAMPLE

Detailed examples will be described hereinafter for describing the present invention in detail, but the present invention is by no means limited to these examples.

Example 1

In this example, an example in which a light waveguide having the structure as shown in FIG. 1E is formed will be described. (Light is not applied in the case where a clad layer is formed, but a voltage that exceeds the Schottky barrier of the photosemiconductor is applied)

(1) Preparation of Core Forming Electrolyte Solution 5 g of styrene-acrylic acid copolymer (molecular weight of 13,000, molar ratio of hydrophobic group/(hydrophobic group + hydrophilic group) of 65%, and acid number of 150) [referred to as "electrodeposition polymer material A" hereinafter] and 0.5 g of titanium oxide having a diameter of 2 nm were dispersed and mixed in 100 g of pure water, and dimethylaminoethanol (liquid that is soluble in water, having the boiling point of 110° C. or higher and the vapor pressure of 100 mmHg or lower) was added in the molar ratio of 180 mmol/l to prepare a mixture. The mixture was adjusted so that pH was adjusted to 7.8 and the conductivity was adjusted to 12 mS/cm by use of tetramethyl ammonium hydroxide and ammonium chloride, and the adjusted liquid was used as a core forming electrolyte solution.

(2) Preparation of Clad Forming Electrolyte Solution

In the same manner as described hereinabove, 5 g of the electrodeposition polymer material A was dispersed and mixed in 100 g of pure water, and dimethylaminoethanol was added in the molar ratio of 180 mmol/l to prepare a mixture. The mixture was adjusted so that pH was adjusted to 7.8 and the conductivity was adjusted to 12 mS/cm by use of tetramethyl ammonium hydroxide and ammonium chloride, and the adjusted liquid was used as a clad forming electrolyte solution.

(3) Forming of Light Waveguide Forming Substrate

A transparent conductive film formed of ITO having a thickness of 100 nm was formed on a no-alkali glass substrate (7059 glass) having a thickness of 0.5 mm by means of sputtering technique, and further $TiO_2$ film having a thickness of 200 nm was formed by means of RF sputtering technique.

(4) Fabrication of Light Waveguide

The bottom clad layer having a thickness of 10 $\mu$m was formed on the entire $TiO_2$ surface by applying a bias voltage of 3.5 V for 20 seconds on the $TiO_2$ electrode that was served as the working electrode to the saturated calomel electrode by use of the clad forming electrolyte solution as the electrolyte solution by means of the triode layout that is used generally in the electrochemistry field as shown in FIG. 8.

Next, without drying the clad layer, the clad forming electrolyte solution was replaced with the core forming electrolyte solution to be used as the electrolyte solution. A core layer having a thickness of 5 $\mu$m and a width of 5 $\mu$m was formed on the region of the $TiO_2$ surface where a light was applied by applying ultraviolet rays for 15 seconds through the electrolyte solution downward from the upper side of the substrate in the state that a bias voltage of 1.8 V was being applied on the working electrode by use of a near-by type exposure device produced by Yamashita Denso Corporation. (wavelength of 365 nm, and light intensity of 50 mW/cm$^2$) and a core forming photomask as shown in FIG. 6.

Next, without drying the clad layer and core layer, the core forming electrolyte solution was replaced with the clad forming electrolyte solution to be used as the electrolyte solution, and the top clad layer having a thickness of 10 $\mu$m was formed on the entire region of the $TiO_2$ surface by applying a bias voltage of 4 V for 35 second on the working electrode.

The substrate was taken out from the liquid tank, cleaned with pure water, and dried to complete a light waveguide substrate.

The obtained light waveguide was cut into a piece having a length of 50 mm by use of a dicing saw, the insertion loss was measured to obtain the transmission loss of about 5 dB at the wavelength of 0.85 $\mu$m.

Example 2

The light waveguide formed by example 1 is heat treated by 140° C. for 3 minutes and the transmissiion loss of the treated light waveguide was measured. The treated waveguide improves transmission loss about 2 dB. This may be considered as the slightly remained pin-holes in the deposited waveguide are removed by the heating process.

Example 3

A light waveguide having the structure shown in FIG. 2E was formed in this example.

The same clad layer forming electrolyte solution and core layer forming electrolyte solution, and the same light waveguide forming substrate as those used in Example 1 were used. A bias voltage of 1.8 V was applied on the $TiO_2$ electrode that was served as the working electrode to the saturated calomel electrode by use of the clad forming electrolyte solution as the electrolyte solution and ultraviolet rays were applied from the back side of the substrate by means of the triode layout that is used generally in the electrochemistry field as shown in FIG. 5. The ultraviolet rays were generated by use of a projection type exposure device produced by Ushio Denki Co. (wavelength of 365 nm and the light intensity of 50 mW/cm$^2$). The projection type exposure device was adjusted so that an image was formed on the bottom clad forming photomask temporarily and then formed through an optical lens on the titanium oxide surface that was the back side of the substrate. The bottom clad layer having a thickness of 10 $\mu$m and a width of 20 $\mu$m was formed only on the region where the $TiO_2$ surface was irradiated with light by applying light for 10 seconds by use of this device (refer to FIG. 2B).

Next, without drying the clad layer, the electrolyte solution was replaced with the core forming electrolyte solution, the photomask was replaced with the core forming photomask, and ultraviolet rays were applied for 15 seconds from the back side of the substrate with a bias voltage of 1.8 V applied on the working electrode. As the result, a core layer having the thickness of 5 $\mu$m and a width of 5 $\mu$m was formed only on the region where on the $TiO_2$ surface was irradiated with light (refer to FIG. 2C).

Next, without drying the clad layer and core layer, the electrolyte solution was replaced with the clad forming electrolyte solution, the photomask was replaced with the clad forming photomask, and ultraviolet rays were applied for 15 seconds from the back side of the substrate with a bias voltage of 1.8 V applied on the working electrode. As the result, a side clad layer having a thickness of 5 $\mu$m was formed only on the region where a light was irradiated on the $TiO_2$ surface (refer to FIG. 2D).

Next, without drying the clad layer and core layer, the electrolyte solution was replaced with the clad forming electrolyte solution, the photomask was replaced with the clad forming photomask, and ultraviolet rays were applied for 35 seconds from the back side of the substrate with a bias voltage of 1.8 V applied on the working electrode. As the result, a top clad layer having the thickness of 10 $\mu$m was formed only on the region where the $TiO_2$ surface was irradiated with light (refer to FIG. 2E).

The substrate was taken out from the liquid tank, cleaned with pure water by dipping method for 3 minutes for removing a remaining salts, and dried with clean air to complete a light waveguide substrate.

The obtained light waveguide was cut into a piece having a length of 50 mm by use of a dicing saw, the insertion loss was measured to obtain the transmission loss of about 2 dB at the wavelength of 0.85 $\mu$m.

Example 4

The completed waveguide in Example 3 was heated at 200° C. for 15 minutes. As the result, slight residual pinholes were removed, and the transmission loss was improved to 1 dB. Furthermore, it was found that the waveguide was rendered insoluble in organic solvent such as acetone due to probably a crosslinking of the polymer.

The obtained light waveguide was excellent in precision and the top face was flat. It was possible to form optical functional parts such as light waveguide and micro-lens array by applying the same photovoltaic electrodeposition process on the region where the clad layer was not formed. Furthermore, it was very easy to form optical functional parts on the top of the light waveguide by applying another process because the top of the light waveguide was flat.

Example 5

In this example, titanium oxide that was served as an photosemiconductor thin film was formed by means of oxidation treatment of titanium, a light waveguide having the same structure as shown in FIG. 1D was formed.

(1) Preparation of Clad Forming Electrolyte Solution 5 g of electrodeposition polymer material A and 1 g of magnesium fluoride particles having a diameter of 5 nm (refractive index of 1.38) were dispersed and mixed in 100 g of pure water, and dimethylaminoethanol was added in the molar ratio of 180 mmol/l to prepare a mixture. The mixture was adjusted so that pH was adjusted to 7.8 and the conductivity was adjusted to 12 mS/cm by use of sodium hydroxide and sodium chloride, and the adjusted liquid was used as a clad forming electrolyte solution.

(2) Preparation of Core Forming Electrolyte Solution 5 g of the electrodeposition polymer material A was dispersed and mixed in 100 g of pure water, and dimethylaminoethanol was added in the molar ratio of 180 mmol/l to prepare a mixture. The mixture was adjusted so that pH was adjusted to 7.8 and the conductivity was adjusted to 12 mS/cm by use of sodium hydroxide and sodium chloride, and the adjusted liquid was used as a core forming electrolyte solution.

(3) Forming of Light Waveguide Forming Substrate

The surface of a metal titanium plate having a thickness of 0.5 mm was subjected to heat treatment at a high temperature to form a titanium oxide film having a thickness of 1000 nm, and the heat treated plate was used as a light waveguide forming substrate. The region that was not covered with the titanium oxide layer was insulated with epoxy resin.

(4) Fabrication of Light Waveguide

The bottom clad layer having a thickness of 10 $\mu$m was formed on the entire $TiO_2$ surface by applying a bias voltage of 3.5 V for 20 seconds on the $TiO_2$ electrode that was served as the working electrode to the saturated calomel electrode by use of the clad forming electrolyte solution as the electrolyte solution by means of the triode layout that is used generally in the electrochemistry field as shown in FIG. 8.

Next, without drying the clad layer, the clad forming electrolyte solution was replaced with the core forming electrolyte solution to be used as the electrolyte solution. A core layer having a thickness of 20 $\mu$m was formed on the region of the $TiO_2$ surface where light was applied by applying ultraviolet rays for 70 seconds through the electrolyte solution downward from the upper side of the substrate in the state that a bias voltage of 1.8 V was being applied on the working electrode by use of a near-by type exposure device produced by Yamashita Denso Co. (wavelength of 365 nm, and light intensity of 50 mW/cm$^2$) and a core forming photomask as shown in FIG. 6.

Next, without drying the clad layer and core layer, the core forming electrolyte solution was replaced with the clad forming electrolyte solution to be used as the electrolyte solution, and the top clad layer having a thickness of 15 $\mu$m was formed on the entire region of the $TiO_2$ surface by applying a bias voltage of 4 V for 50 second on the working electrode by means of the device as shown in FIG. 8.

The substrate was taken out from the liquid tank, cleaned with pure water, and dried to complete a light waveguide substrate.

The obtained light waveguide was cut into a piece having a length of 50 mm by use of a dicing saw, the insertion loss was measured to obtain the transmission loss of about 5 dB at the wavelength of 0.85 μm.

Example 6

The completed waveguide in Example 5 was heated at a temperature of 140° C. for 3 minutes and the transmission loss was improved to approximately 2 dB.

Example 7

In this example, zinc oxide served as an photosemiconductor thin film was formed by means of anode oxidation treatment of zinc, and a light waveguide having the same structure as shown in FIG. 1D was formed.
(1) Preparation of Clad Forming Electrolyte Solution 5 g of electrodeposition polymer material A and 1.5 g of magnesium fluoride particles having a diameter of 5 nm (refractive index of 1.38) were dispersed and mixed in 100 g of pure water, and dimethylaminoethanol was added in the molar ratio of 180 mmol/l to prepare a mixture. The mixture was adjusted so that pH was adjusted to 7.8 and the conductivity was adjusted to 12 mS/cm by use of sodium hydroxide and sodium chloride, and the adjusted liquid was used as a clad forming electrolyte solution.
(2) Preparation of Core Forming Electrolyte Solution 5 g of the electrodeposition polymer material A and 0.25 g of titanium oxide particles having a diameter of 2 nm (refractive index of 2.3) were dispersed and mixed in 100 g of pure water, and dimethylaminoethanol was added in the molar ratio of 180 mmol/l to prepare a mixture. The mixture was adjusted so that pH was adjusted to 7.8 and the conductivity was adjusted to 12 mS/cm by use of sodium hydroxide and sodium chloride, and the adjusted liquid was used as a core forming electrolyte solution.
(3) Forming of Light Waveguide Forming Substrate A zinc plate laminated with a zinc oxide layer having a thickness of 1000 nm formed by anode oxidation treatment applied on the surface of the zinc plate was used as a light waveguide forming substrate.
(4) Fabrication of Light Waveguide The bottom clad layer having a thickness of 10 μm was formed on the entire zinc oxide surface by applying a bias voltage of 3.5 V for 20 seconds on the $TiO_2$ electrode that was served as the working electrode to the saturated calomel electrode by use of the clad forming electrolyte solution as the electrolyte solution by means of the triode layout that is used generally in the electrochemistry field as shown in FIG. 8.

Next, without drying the clad layer, the clad forming electrolyte solution was replaced with the core forming electrolyte solution to be used as the electrolyte solution. A core layer having a thickness of 5 μm was formed only on the region of the zinc oxide surface where a He—Cd laser was scanned with a scanning speed of 1 mm/second through the electrolyte solution downward from the upper side of the substrate in the state that a bias voltage of 1.8 V was being applied on the working electrode by use of a He—Cd laser (wavelength of 331 nm and light intensity of 10 mW/cm²) that was capable of scanning with aid of a scanning stage as shown in FIG. 7.

Next, without drying the clad layer and core layer, the core forming electrolyte solution was replaced with the clad forming electrolyte solution to be used as the electrolyte solution, and the top clad layer having a thickness of 10 μm was formed on the entire region of the clad layer and core layer surface by applying a bias voltage of 4 V for 35 second on the working electrode.

The substrate was taken out from the liquid tank, cleaned with pure water, and dried to complete a light waveguide substrate.

The obtained light waveguide was cut into a piece having a length of 50 mm by use of a dicing saw, the insertion loss was measured to obtain the transmission loss of about 5 dB at the wavelength of 0.85 μm.

Example 8

The completed waveguide in example 7 was heated at a temperature of 140° C. for 15 minutes and the transmission loss was improved to approximately 1 dB.

Example 9

Figure 3F:
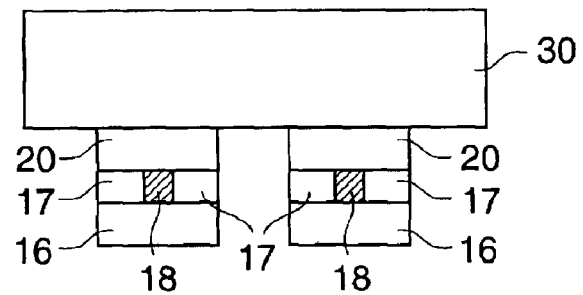

In this example, a light waveguide having the same structure as shown in FIG. 3F was formed by means of the photovoltaic electrodeposition transfer technique.
(1) Forming of Film Deposition Substrate An ITO transparent conductive film having a thickness of 200 nm was formed on a Pyrex glass plate having a thickness of 1 mm by means of sputtering, and additionally a $TiO_2$ thin film having a thickness of 300 nm was formed by means of RF sputtering technique. A peel layer was formed on $TiO_2$ film by applying spin coating technique in which a 1% oleic acid solution (ethylacetate solvent) was applied at a rotation speed of 4000 rpm for 20 seconds.
(2) Clad Layer and Core Layer Forming Electrolyte Solution The electrolyte solution having the same composition as used in Example 4 was used.
(3) Forming of Clad Layer and Core Layer A laminate having the bottom clad layer-core layer-side clad layer-top clad layer was formed on a peel layer in the same manner as used in Example 2 (refer to FIG. 3B to FIG. 3E), the substrate was taken out from the liquid tank and cleaned with pure water for 3 minutes by dip method to remove remaining salts, and dried with clean air.
(4) Transfer of Light Waveguide A polyethylene film having a thickness of 0.5 mm heated to a temperature of 150° C. was placed on the light waveguide surface, these materials were pressed and heated between two rolls that were pressed each other with a linear pressure of 200 g/cm at a linear speed of 20 mm/sec, the laminate was thereafter delaminated between the peel layer and the light waveguide. Thereby, the formed light waveguide was transferred onto the polyethylene film.

The obtained light waveguide was cut into a piece having a linear length of 50 mm by use of a dicing saw, the insertion loss was measured to obtain the transmission loss of about 3 dB at the wavelength of 0.85 μm.

Example 10

In this example, a light waveguide having the structure shown in FIG. 1D was formed by means of photovoltaic electrodeposition transfer technique.

In this example, following operations were carried out.
(1) Forming of Film Deposition Substrate An ITO transparent conductive film having a thickness of 200 nm is formed on a polyimide film having a thickness of 0.3 mm by means of sputtering technique, and a $TiO_2$ film having a thickness of 300 nm was formed by means of RF sputtering. A peel layer was formed on the $TiO_2$ film by use of a 0.5% silicone oil solution (hexane solvent) by means of dip coating technique (drawing up speed of 20 mm/sec).
(2) Clad Layer Forming and Core Layer Forming Electrolyte Solution An electrolyte solution having the same composition as used in Example 1 was used.

(3) Forming of Clad Layer and Core Layer

A laminate having a clad layer-core layer-clad layer was formed on the peel layer in the same manner as used in Example 1, the laminate was taken out from the liquid tank, cleaned with pure water by dipping method for 3 minutes for removing salts, and dried with clean air.

(4) Transfer of Light Waveguide

A glass epoxy substrate served as a printed substrate having the surface on which adhesive layer was coated was placed on the light waveguide surface to form a laminate, the laminate was subjected to press heat treatment by feeding it between two rollers that were pressed each other with a linear pressure of 100 g/cm at a linear speed of 20 mm/sec, the laminate was delaminated thereafter between the peel layer and the light waveguide to transfer the formed light waveguide substrate on the glass epoxy substrate.

The obtained light waveguide was cut into a piece having a linear length of 50 mm by use of a dicing saw, the insertion loss was measured, and it was found that the transmission loss of about 3 dB at the wavelength of 0.85 $\mu$m was obtained.

Example 11

Figure 4C:
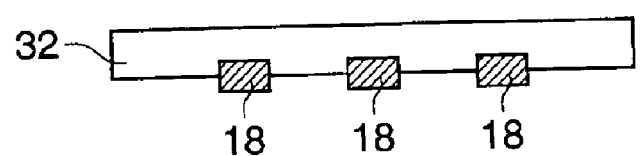
Figure 4D:
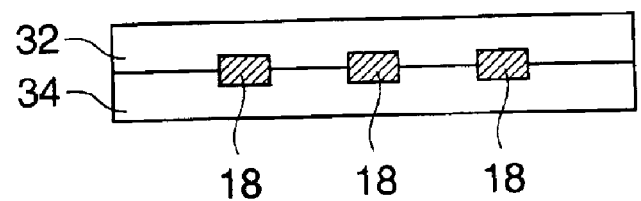

In this example, a light waveguide having the structure shown in FIG. 4D was formed.

(1) Forming of Film Deposition Substrate

An ITO transparent conductive film having a thickness of 200 nm was formed on a Pyrex glass plate having a thickness of 3 mm by mean of sputtering technique, and the same pattern as that of the core layer to be formed by means of usually used etching treatment. A peel layer layer was formed on the patterned ITO by spin coating 1% oleic acid solution (ethylacetate solvent) at a rotation speed of 4000 rpm for 20 seconds.

(2) Forming of Core Layer

The core forming electrolyte solution having the same composition as that used in Example 1 was used. The core layer having a thickness of 30 $\mu$m and a width of 30 $\mu$m was formed only on the region on ITO by applying a bias voltage of 3 V for 90 seconds on the ITO film that was served as the working electrode to the saturated calomel electrode by use of the core forming electrolyte solution as the electrolyte solution by means of the triode layout that is used generally in the electrochemistry field as shown in FIG. 8 (refer to FIG. 4B).

The substrate was taken out from the liquid tank, and cleared with pure water by dipping method for 10 minutes to remove remaining salts, and dried with clean air.

(3) Transfer of Core Layer

A polyethylene film having a thickness of 0.2 mm was placed on the core layer surface to form a laminate, the laminate was subjected to press heat treatment by feeding it between two rollers that were pressed each other with a linear pressure of 300 g/cm and heated to a temperature of 120° C. at a linear speed of 20 mm/sec, the laminate was delaminated thereafter between the peel layer and the core layer, and the formed core layer was transferred on the polyethylene film (refer to FIG. 4C).

Furthermore, another polyethylene film having a thickness of 0.2 mm was placed tightly on the core layer to form a laminate, the laminate was subjected to press heat treatment by feeding it between two rollers that were pressed each other with a liner pressure of 300 g/cm at a roller surface temperature of 170° C. and at a linear speed of 20 mm/sec. As the result, a light waveguide having the two polyethylene films that were served also as the top and bottom clad layers was completed (refer to FIG. 4D).

The obtained light waveguide was cut into a piece having a linear length of 50 mm by use of a dicing saw, the insertion loss was measured, and it was found that the transmission loss of about 4 dB at the wavelength of 0.85 $\mu$m was obtained.

Because electrodeposition technique and photovoltaic electrodeposition are used in the light waveguide forming method, a light waveguide having the fine pattern can be formed precisely without applying the high voltage (equal to or lower than 5 V). Furthermore, it is required to coat a film on a substrate so that the film thickness is controlled precisely and alkali waste liquid is generated from etching process in the case of the conventional light waveguide forming method in which photosensitive resin is used. On the other hand, according to the present invention, the film thicknesses of a core layer and clad layer can be controlled easily by adjusting the light irradiation time or voltage application time, etching process is not necessary, and the load on the environment is mitigated.

Because the light waveguide forming method of the present invention in which electrodeposition technique or photovoltaic electrodeposition technique is employed is a simple method, the method of the present invention is suitable for mass-production and can be applied advantageously to manufacture the light waveguide type parts for which mass-productivity is required. Furthermore, the present invention can be applied to various light waveguides, optical integrated circuits, or optical wiring boards used in the field of general optics and small optics, and the field of optical communication and optical information processing.

The entire disclosure of Japanese Patent Application No. 2001-60242 filed on Mar. 5, 2001 including specification, claims, drawings and abstract is incorporated herein by reference in its entirety.

What is claimed is:

1. A light waveguide forming method comprising the steps of:

forming a laminate by disposing a light waveguide forming substrate having a conductive thin film and a photosemiconductor thin film in this order on an insulative substrate so that at least the photosemiconductor thin film of the light waveguide forming substrate is in contact with an aqueous electrolyte solution containing film forming material having a property that solubility or dispersibility in a water solution decreases according to change of its pH; and applying a voltage between a selected region of the photosemiconductor thin film and a counter electrode by irradiating the selected region of the photosemiconductor thin film with light to deposit the material on the selected region of the semiconductor thin film.

2. The light waveguide forming method according to claim 1, wherein a clad layer is formed on the photosemiconductor thin film by use of a clad layer forming electrolyte solution, and a core layer is formed on the clad layer by use of a core layer forming electrolyte solution without drying the clad layer.

3. The light waveguide forming method according to claim 2, wherein without drying the clad layer and the core layer, another clad layer is formed on the core layer by use of a clad layer forming electrolyte solution.

4. The light waveguide forming method according to claim 2, wherein the clad layer is formed on an entire surface of the photosemiconductor thin film by means of electrodeposition technique by applying a voltage higher than Schottky barrier of the photosemiconductor thin film of the light waveguide forming substrate without light irradiation.

5. The light waveguide forming method according to claim 2, wherein the clad layer forming electrolyte solution contains a polymer material, and the core layer forming electrolyte solution contains the polymer material and particles having a refractive index higher than that of the polymer material.

6. The light waveguide forming method according to claim 2, wherein the core layer forming electrolyte solution contains a polymer material, and the clad layer forming electrolyte solution contains the polymer material and particles having a refractive index lower than that of the polymer material.

7. The light waveguide forming method according to claim 2, wherein the clad layer forming electrolyte solution contains a polymer material and particles having a refractive index lower than that of the polymer material, and the core layer forming electrolyte solution contains the polymer material and particles having a refractive index higher than that of the polymer material.

8. The light waveguide forming method according to claim 1, wherein the light waveguide forming substrate comprises a laminate having a photosemiconductor thin film on a conductive substrate.

9. The light waveguide forming method according to claim 1, wherein the conductive thin film is made of a conductive material, the conductive material being at least any one selected from a group including iron, a compound of iron, nickel, a compound of nickel, zinc, a compound of zinc, copper, a compound of copper, titanium, a compound of titanium, and mixtures of these materials.

10. The light waveguide forming method according to claim 1, wherein the film forming material having a property that solubility or dispersibility in a water solution decreases according to change of its pH is a polymer material.

11. The light waveguide forming method according to claim 1, wherein the light waveguide forming substrate serves as an anode, and the applied voltage is equal to or lower than 5 V.

12. The light waveguide forming method according to claim 1, wherein the film forming material contains a polymer material and the laminate is treated with heat.

13. A light waveguide forming method comprising the steps of:
disposing a film deposition substrate having a conductive thin film, an photosemiconductor thin film, and a peel layer in this order on an insulative substrate so that at least the photosemiconductor thin film of the film deposition substrate is in contact with an aqueous electrolyte solution containing film forming material having a property that the solubility or dispersibility in a water solution decreases according to change of its pH;
applying a voltage between a selected region of the photosemiconductor thin film and a counter electrode by irradiating the selected region of the photosemiconductor thin film with light to deposit the material on the selected region of the semiconductor thin film; and
transferring the deposited material onto a light waveguide forming substrate.

14. A light waveguide forming method comprising the steps of:
disposing a light waveguide forming substrate having a conductive thin film or a patterned conductive thin film on an insulative substrate so that the conductive thin film or the patterned conductive thin film of the light waveguide forming substrate is in contact with an aqueous electrolyte solution containing film forming material having a property that solubility or dispersibility in a water solution decreases according to change of its pH; and
applying a voltage between the conductive thin film or the patterned conductive thin film and a counter electrode to deposit the film forming material on the conductive thin film.

15. A light waveguide forming method comprising the steps of:
disposing a film deposition substrate having a conductive thin film or a patterned conductive thin film, and a peel layer in this order on an insulative substrate so that at least the conductive thin film or the patterned conductive thin film of the film deposition substrate is in contact with an aqueous electrolyte solution containing film forming material having a property that solubility or dispersibility in a water solution decreases according to change of its pH;
applying a voltage between the conductive thin film or the patterned conductive thin film and a counter electrode to deposit the film forming material on the conductive thin film; and
transferring the deposited film forming material onto a light waveguide forming substrate.

* * * * *